US007016648B2

(12) United States Patent
Haller et al.

(10) Patent No.: US 7,016,648 B2
(45) Date of Patent: Mar. 21, 2006

(54) METHOD, SYSTEM AND COMPUTER READABLE MEDIUM FOR DOWNLOADING A SOFTWARE COMPONENT TO A DEVICE IN A SHORT DISTANCE WIRELESS NETWORK

(75) Inventors: Amit Haller, Belmont, CA (US); Peter Fornell, Lake Oswego, OR (US); Avraham Itzchak, Ra'anana (IL); Ziv Haparnas, Tel Aviv (IL)

(73) Assignee: IXI Mobile (Israel) Ltd., Ra'Anana (IL)

( * ) Notice: Subject to any disclaimer, the term of this patent is extended or adjusted under 35 U.S.C. 154(b) by 0 days.

(21) Appl. No.: 10/298,753

(22) Filed: Nov. 18, 2002

(65) Prior Publication Data

US 2003/0143952 A1    Jul. 31, 2003

Related U.S. Application Data

(63) Continuation-in-part of application No. 10/023,525, filed on Dec. 18, 2001.

(51) Int. Cl.
H04B 7/00    (2006.01)
(52) U.S. Cl. ............... 455/41.2; 455/419; 455/426.1; 455/556.1; 455/556.2; 455/557
(58) Field of Classification Search ............... 455/419, 455/41.2, 414.2, 426.1, 556.1–557
See application file for complete search history.

(56) References Cited

U.S. PATENT DOCUMENTS

| 5,442,680 A | 8/1995 | Schellinger et al. |
| 5,457,737 A | 10/1995 | Wen |
| 5,572,528 A | 11/1996 | Shuen |
| 5,742,237 A | 4/1998 | Bledsoe |
| 5,771,438 A | 6/1998 | Palermo et al. |
| 5,774,791 A * | 6/1998 | Strohallen et al. ......... 455/41.1 |
| 5,793,763 A | 8/1998 | Mayes et al. |
| 5,805,166 A | 9/1998 | Hall, Jr. et al. |
| 5,838,252 A | 11/1998 | Kikinis |
| 5,896,369 A | 4/1999 | Warsta et al. |
| 5,929,848 A | 7/1999 | Albukerk et al. |
| 5,978,386 A * | 11/1999 | Hamalainen et al. ....... 370/466 |

(Continued)

FOREIGN PATENT DOCUMENTS

JP        3153213        4/2001

(Continued)

OTHER PUBLICATIONS

Yee et al., "Integrating Bluetooth With Wireless And Ricocheting", pp. 1310-1314, 2000 IEEE.

(Continued)

*Primary Examiner*—William Trost
*Assistant Examiner*—Sharad Rampuria
(74) *Attorney, Agent, or Firm*—Vierra Magen Marcus Harmon & DeNiro LLP

(57) ABSTRACT

A method, system, and computer readable medium allows downloading of a software component to a short distance wireless network in response to device information and/or user information. In an embodiment of the present invention, the device information includes type of device, manufacturer of device, where purchased, when activated in the short distance wireless network. In an embodiment of the present invention, user information includes a user preference, price plan, usage, promotional plan and/or replacement plan. In an embodiment of the present invention, device information is included in a short-range radio signal generated from the device to a cellular device. In an embodiment of the present invention, software components are downloaded from a processing device in a Wide Area Network (WAN) coupled to the short distance wireless network.

30 Claims, 15 Drawing Sheets

U.S. PATENT DOCUMENTS

| | | | | |
|---|---|---|---|---|
| 5,987,011 | A * | 11/1999 | Toh | 370/331 |
| 5,987,033 | A | 11/1999 | Boer et al. | |
| 6,064,734 | A | 5/2000 | Hasegawa et al. | |
| 6,067,291 | A | 5/2000 | Kamerman et al. | |
| 6,069,896 | A | 5/2000 | Borgstahl et al. | |
| 6,078,789 | A | 6/2000 | Bodenmann et al. | |
| 6,085,098 | A | 7/2000 | Moon et al. | |
| 6,130,602 | A | 10/2000 | O'Toole et al. | |
| 6,151,628 | A | 11/2000 | Xu et al. | |
| 6,192,257 | B1 * | 2/2001 | Ray | 455/566 |
| 6,198,948 | B1 | 3/2001 | Sudo et al. | |
| 6,218,958 | B1 * | 4/2001 | Eichstaedt et al. | 340/7.6 |
| 6,223,029 | B1 * | 4/2001 | Stenman et al. | 455/420 |
| 6,243,581 | B1 | 6/2001 | Jawanda | |
| 6,265,788 | B1 | 7/2001 | Davidson et al. | |
| 6,282,183 | B1 | 8/2001 | Harris et al. | |
| 6,298,443 | B1 | 10/2001 | Colligan et al. | |
| 6,333,973 | B1 | 12/2001 | Smith et al. | |
| 6,343,276 | B1 * | 1/2002 | Barnett | 705/28 |
| 6,405,027 | B1 * | 6/2002 | Bell | 455/403 |
| 6,434,537 | B1 | 8/2002 | Grimes | |
| 6,446,127 | B1 | 9/2002 | Schuster et al. | |
| 6,452,910 | B1 | 9/2002 | Vij et al. | |
| 6,459,882 | B1 * | 10/2002 | Palermo et al. | 455/41.1 |
| 6,463,078 | B1 | 10/2002 | Engstrom et al. | |
| 6,487,180 | B1 * | 11/2002 | Borgstahl et al. | 370/310 |
| 6,519,460 | B1 * | 2/2003 | Haartsen | 455/452.1 |
| 6,532,366 | B1 * | 3/2003 | Chung et al. | 455/445 |
| 6,600,428 | B1 | 7/2003 | O'Toole et al. | |
| 6,600,734 | B1 * | 7/2003 | Gernert et al. | 370/352 |
| 6,630,925 | B1 | 10/2003 | Ostergård et al. | |
| 6,633,759 | B1 | 10/2003 | Kobayashi | |
| 6,636,489 | B1 * | 10/2003 | Fingerhut | 455/419 |
| 6,654,616 | B1 | 11/2003 | Pope, Jr. et al. | |
| 6,665,549 | B1 | 12/2003 | Reed | |
| 6,763,247 | B1 * | 7/2004 | Hollstrom et al. | 455/556.1 |
| 6,871,063 | B1 * | 3/2005 | Schiffer | 455/410 |
| 2001/0047424 | A1 | 11/2001 | Alastalo et al. | |
| 2002/0010008 | A1 | 1/2002 | Bork et al. | |
| 2002/0010683 | A1 | 1/2002 | Aune | |
| 2002/0037700 | A1 | 3/2002 | Dooley et al. | |
| 2002/0055333 | A1 | 5/2002 | Davies et al. | |
| 2002/0058502 | A1 | 5/2002 | Stanforth | |
| 2002/0063472 | A1 | 5/2002 | Irvin | |
| 2002/0065099 | A1 | 5/2002 | Bjorndahl | |
| 2002/0065817 | A1 * | 5/2002 | Ito et al. | 707/5 |
| 2002/0068559 | A1 | 6/2002 | Sharma et al. | |
| 2002/0068600 | A1 | 6/2002 | Chihara et al. | |
| 2002/0069037 | A1 * | 6/2002 | Hendrickson et al. | 702/186 |
| 2002/0082054 | A1 | 6/2002 | Keinonen et al. | |
| 2002/0086718 | A1 | 7/2002 | Bigwood et al. | |
| 2002/0091633 | A1 * | 7/2002 | Proctor | 705/39 |
| 2002/0102974 | A1 | 8/2002 | Raith | |
| 2002/0118663 | A1 | 8/2002 | Dorenborsch et al. | |
| 2002/0128051 | A1 | 9/2002 | Liebenow | |
| 2002/0132610 | A1 | 9/2002 | Chaplin et al. | |
| 2002/0142762 | A1 * | 10/2002 | Chmaytelli et al. | 455/418 |
| 2002/0143952 | A1 * | 10/2002 | Sugiarto et al. | 709/227 |
| 2002/0155830 | A1 | 10/2002 | Iyer | |
| 2002/0160764 | A1 * | 10/2002 | Gorsuch | 455/419 |
| 2003/0013438 | A1 * | 1/2003 | Darby | 455/419 |
| 2003/0017810 | A1 | 1/2003 | Janninck et al. | |
| 2003/0022699 | A1 | 1/2003 | Lin | |
| 2003/0027563 | A1 * | 2/2003 | Herle et al. | 455/419 |
| 2003/0032417 | A1 * | 2/2003 | Minear et al. | 455/419 |
| 2003/0050058 | A1 | 3/2003 | Walsh et al. | |
| 2003/0054765 | A1 | 3/2003 | Botteck | |
| 2003/0060188 | A1 * | 3/2003 | Gidron et al. | 455/408 |
| 2003/0060189 | A1 * | 3/2003 | Minear et al. | 455/411 |
| 2003/0078036 | A1 * | 4/2003 | Chang et al. | 455/419 |
| 2003/0091917 | A1 | 5/2003 | Davenport et al. | |
| 2003/0114105 | A1 | 6/2003 | Haller et al. | |
| 2003/0115351 | A1 | 6/2003 | Giobbi | |
| 2003/0122856 | A1 | 7/2003 | Hubbard | |
| 2003/0143992 | A1 | 7/2003 | Humphrey et al. | |
| 2003/0153280 | A1 | 8/2003 | Kopp et al. | |
| 2003/0187807 | A1 | 10/2003 | Matsubara et al. | |
| 2003/0214940 | A1 | 11/2003 | Takken | |
| 2003/0224773 | A1 | 12/2003 | Deeds | |
| 2003/0232616 | A1 | 12/2003 | Gidron et al. | |
| 2004/0048671 | A1 | 3/2004 | Rowe | |
| 2004/0066769 | A1 | 4/2004 | Ahmavaara et al. | |
| 2004/0196812 | A1 | 7/2004 | Barber | |
| 2004/0192384 | A1 | 9/2004 | Anastasakos et al. | |

FOREIGN PATENT DOCUMENTS

WO     WO 99/48315     9/1999

OTHER PUBLICATIONS

Haartsen, "BLUETOOTH—The universal radio interface for ad hoc wireless connectivity", pp. 110-117, Ericsson Review No. 3, 1998.

Karagiannis, "Mobility support for ubiquitous Internet access", Ericsson Open report, pp. 1-70, Dec. 21, 2000.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

Guthery et al., "The WebSIM—Clever Smartcards Listen to Port 80", version 15.12.99.

Project P946-GI, Smart Devices "When Things Start to Think", Jan. 2000, 2000 EURESCOM Participants in Project P946-GI.

* cited by examiner

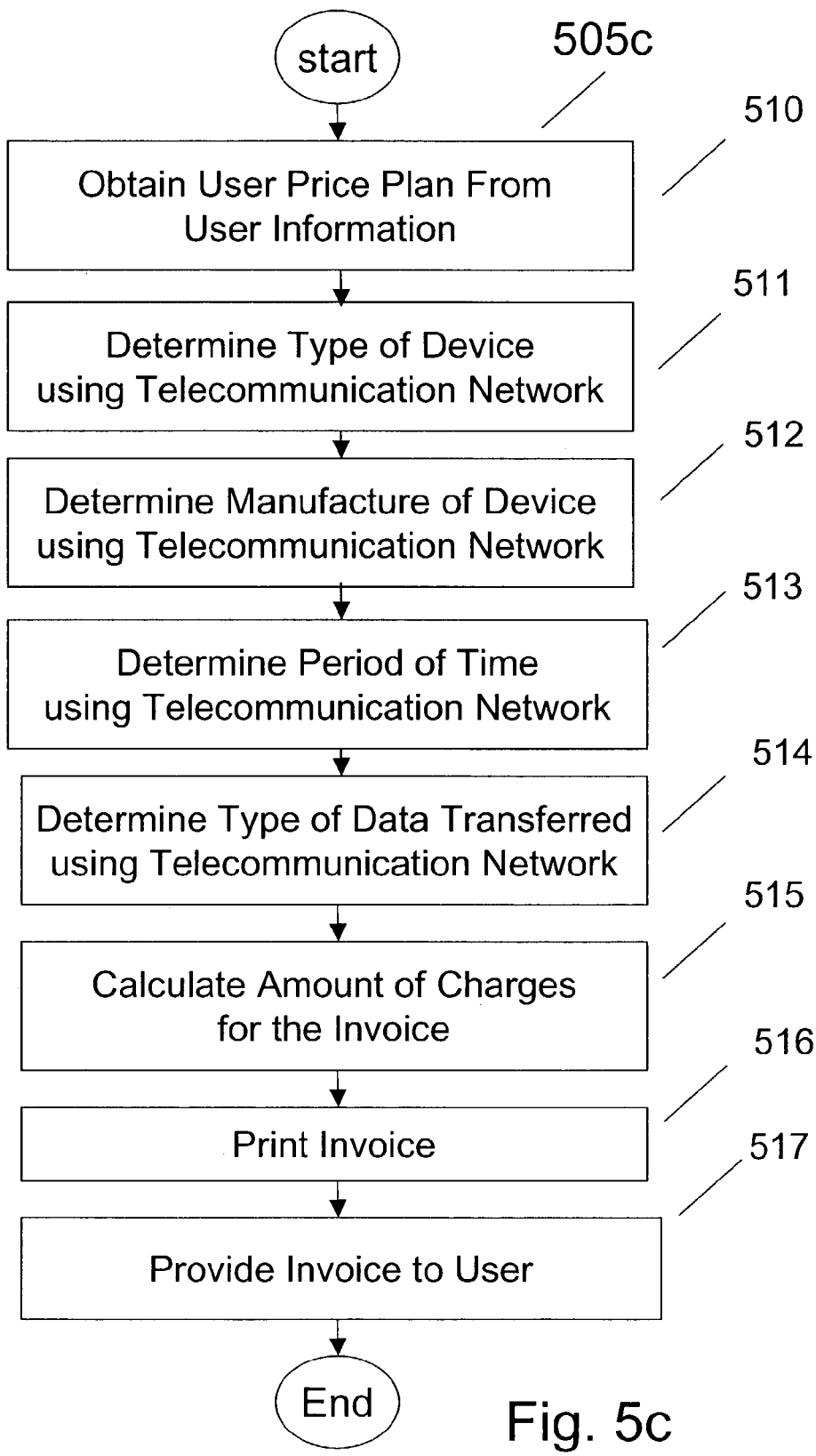

METHOD, SYSTEM AND COMPUTER READABLE MEDIUM FOR DOWNLOADING A SOFTWARE COMPONENT TO A DEVICE IN A SHORT DISTANCE WIRELESS NETWORK

RELATED APPLICATION

This application is a continuation-in-part of U.S. patent application Ser. No. 10/023,525, entitled "A Method, System and Computer Readable Medium for Making A Business Decision in Response to Information from a Short Distance Wireless Network," filed on Dec. 18, 2001, which is incorporated herein by reference.

FIELD OF THE INVENTION

This invention relates generally to a network.

BACKGROUND OF THE INVENTION

A wireless communication device, such as a cellular telephone, is typically a node of a WAN or communication network. The cellular telephone may also be a part of a short distance wireless network for communicating with other user devices, such as a laptop, printer, Personal Digital Assistant ("PDA") and/or headset. For example, Bluetooth™ technology (www.Bluetooth.com) provides wireless communications between devices in a short distance wireless network.

When a user purchases a device for a short distance wireless network, software may need to be added to the device and/or short distance wireless network in order to operate properly in the user's short distance wireless network and function as intended. A user of the device may desire to load software into the device to enhance functionality, but may not have the technical ability. Further, a user, retailer, distributor or manufacturer may not have the proper software or version of the software to operate with the user's short distance wireless network. Similarly, a new version of software may have been recently released; yet, the purchased device comes with a compact disk storing the older version of the software and the user prefers or requires the new version. Also, a retailer, distributor or manufacturer may not be aware of the preferences of the user's short distance wireless network.

In addition, a telecommunication operator is interested in providing added value and functionality to a user of a telecommunication network, while increasing revenue.

Therefore, it is desirable to provide a method, a system, and a computer readable medium that easily and conveniently provides a software component to a device in a short distance wireless network with little or no user, retailer, distributor or manufacturer intervention. Likewise, it is desirable to provide added functionality and value to a wireless device, while increasing telecommunication operator revenue.

SUMMARY OF THE INVENTION

A method, system, and computer readable medium provides a software component to a device in a short distance wireless network responsive to device information according to embodiments of the present invention.

According to an embodiment of the present invention, a method comprises the steps of obtaining device information from a device in a short distance wireless network and downloading a software component to the device in response to the device information.

According to an embodiment of the present invention, the obtaining step further comprises the steps of generating a short range radio signal, containing the device information, from the device, to a cellular device and, generating a cellular signal, containing the device information, from the cellular device to a processing device in a wide area network.

According to an embodiment of the present invention, the software component is downloaded in response to a user preference According to an embodiment of the present invention, the software component is downloaded in response to a date.

According to an embodiment of the present invention, the software component is downloaded in response to where the device was purchased.

According to an embodiment of the present invention, the software component is downloaded in response to a user price plan.

According to an embodiment of the present invention, the software component is downloaded in response to a user usage.

According to an embodiment of the present invention, the software component is downloaded in response to a manufacturer of the device.

According to an embodiment of the present invention, the device is a Bluetooth™ device communicating with a cellular device.

According to an embodiment of the present invention, the device is a messaging terminal.

According to an embodiment of the present invention, the software component is an instant messaging terminal software component.

According to an embodiment of the present invention, the device includes a short-range radio processor and a 2.4 GHZ or 5.7 GHZ transceiver.

According to an embodiment of the present invention, the device is selected from a group consisting of a desktop computer, a laptop computer, a personal digital assistant, a headset, a pager, a printer, a watch, a thin terminal, a digital camera and an equivalent.

According to an embodiment of the present invention, the short distance wireless network is a Bluetooth™ network.

According to an embodiment of the present invention, a method comprises the steps of generating a short-range radio signal, containing device information, from a device, to a cellular device. A cellular signal is generated, containing the device information, from the cellular device to a processing device in a wide area network. A software component is downloaded to the device in response to the device information and user information.

According to an embodiment of the present invention, a system comprises a device to generate a short-range radio signal containing device information. A cellular device generates a cellular signal, containing the device information, responsive to the short-range radio signal. A processing device, having a database containing a plurality of software components, provides a first software component in the plurality of software components in response to the device information.

According to an embodiment of the present invention, the database includes a user preference and the first software component is downloaded in response to the device information and the user preference.

An article of manufacture, including a computer readable medium, comprises a short-range radio software component to receive a short-range radio signal, containing device type information, from a device in a short distance wireless network. A cellular software component generates a cellular signal, containing the device type information, in a cellular network and receives a software component for the device.

Other aspects and advantages of the present invention can be seen upon review of the figures, the detailed description, and the claims that follow.

BRIEF DESCRIPTION OF THE FIGURES

FIGS. 5a–h are flowcharts illustrating providing a software component in response to device information from a short distance wireless network according to an embodiment of the present invention.

DETAILED DESCRIPTION

I. System Overview

Figure 1A:
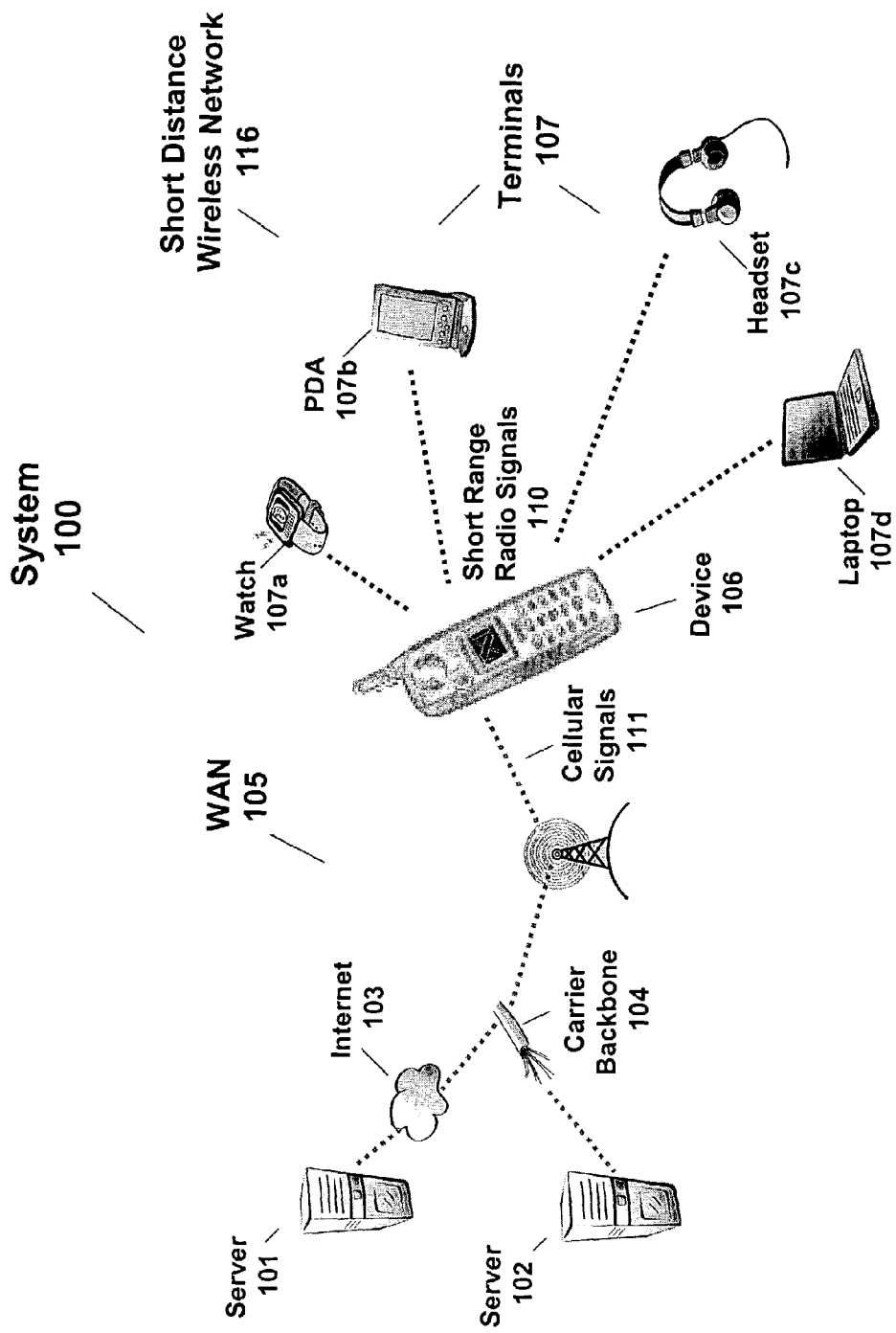
FIGS. 1a–b illustrates a system according to an embodiment of the present invention.

The following description and claims relate to a method, a system, and a computer readable medium for providing a software component responsive to device information from a short distance wireless network 116 and user information, as illustrated by FIG. 1a, according to an embodiment of the present invention.

The information from a short distance wireless network 116, in an embodiment of the present invention, includes usage information of a WAN 105, coupled to short distance wireless network 116, that may include a telecommunication cellular network. The usage information includes 1) a type of device (e.g. cellular telephone 106, laptop 107d, PDA 107b) accessing WAN 105 or causing WAN 105 to be accessed, 2) a manufacture of the device accessing WAN 105 or causing WAN 105 to be accessed, 3) a type of data transferred (e.g. voice, image, video) over WAN 105, and 4) a period of time accessing WAN 105 or causing WAN 105 to be accessed, singly or in combination, in an embodiment of the present invention.

Figure 1B:
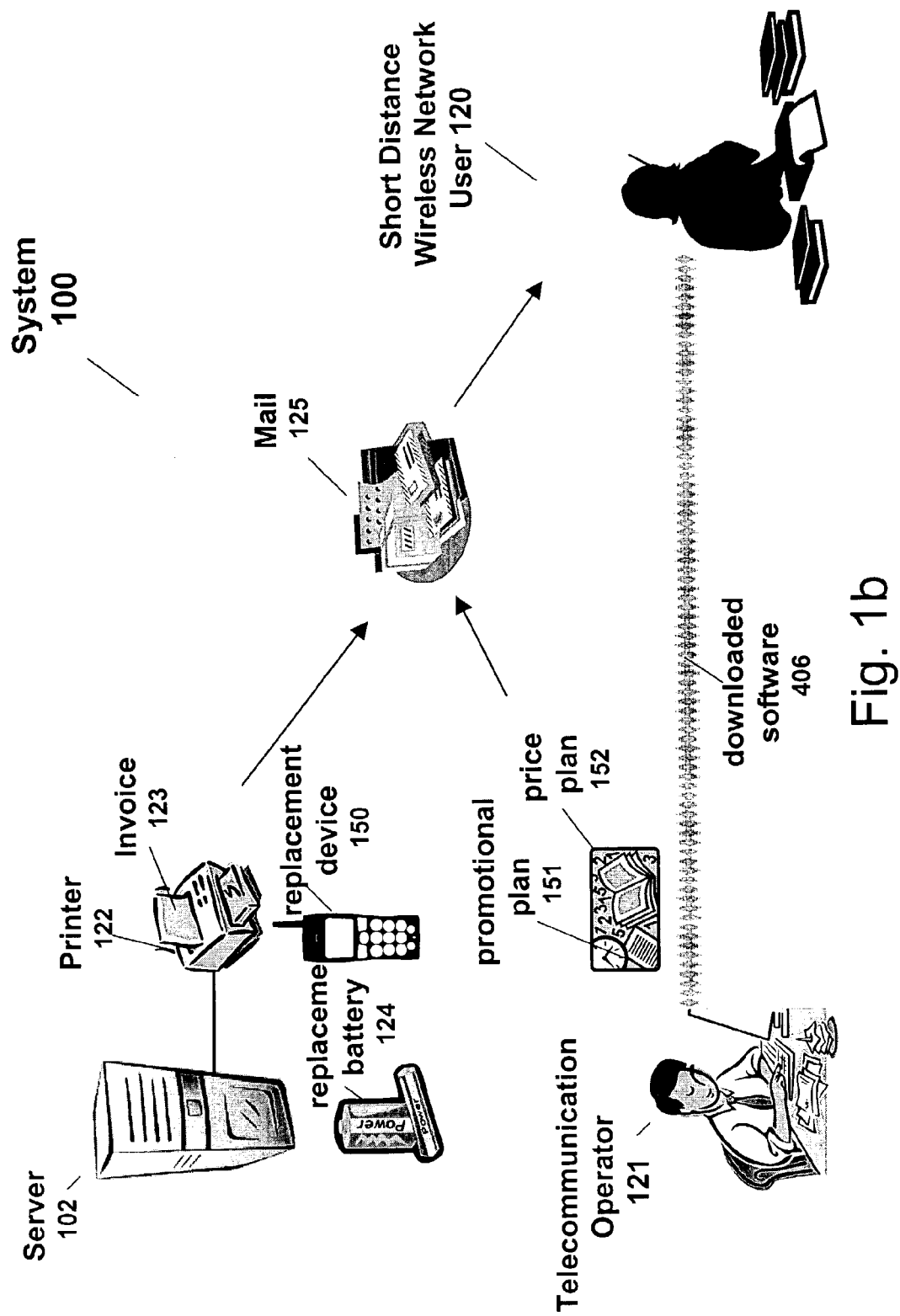

A software component is provided to device 106 and/or terminals 107 in response to information obtained from short distance wireless network 116 as illustrated in FIG. 1b. In an embodiment of the present invention, the software component is provided in response to device information including 1) a type of device and/or terminal, 2) manufacture of the device and/or terminal, 3) where a device and/or terminal was purchased, and/or 4) activation date. In an embodiment of the present invention, user information includes 1) user's preference and/or profile, 2) user's price plan, 3) user's usage, 4) promotional plan and/or 5) user's replacement plan. In an embodiment of the present invention, device information is obtained from short distance wireless network 116 and user information is obtained from server 101.

In an embodiment of the present invention, a short distance wireless network 116 is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, singly or in combination, or an equivalent. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

FIG. 1a illustrates system 100 according to an embodiment of the present invention. System 100 includes other devices, or terminals 107, coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d. In an alternate embodiment, fewer or more terminals are used in short distance wireless network 116. In an alternate embodiment, terminals 107 include a desktop computer, a pager, a printer, a thin terminal, messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7

Figure 3A:
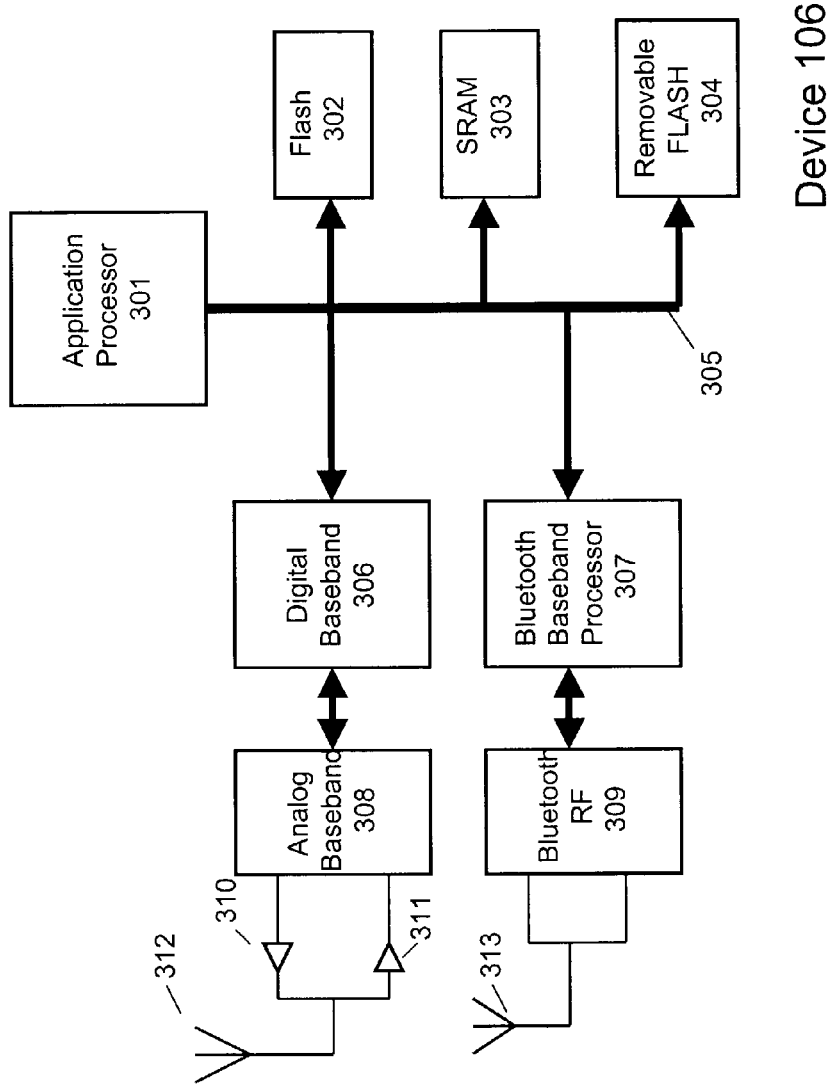
FIGS. 3a–b are hardware block diagrams of devices according to an embodiment of the present invention.
Figure 3B:
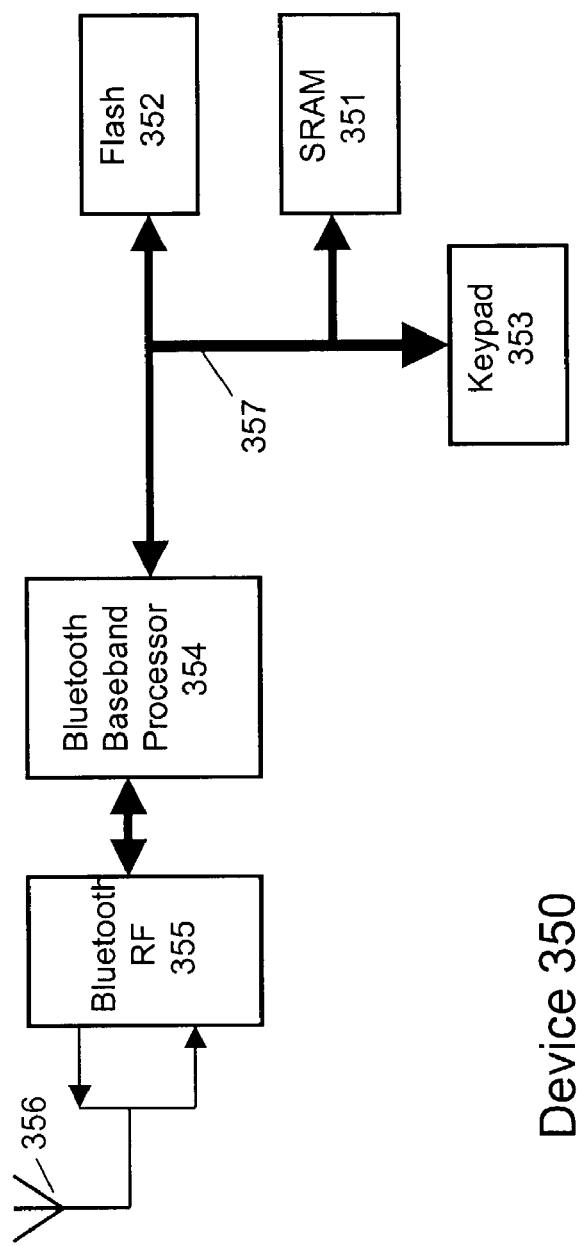

GHz transceiver is used. Hardware for device 106 and terminals 107 is illustrated in FIGS. 3*a–b* in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), or General Packet Radio Service ("GPRS") protocol or an equivalent is used.

In an embodiment of the present invention, WAN 105 includes carrier backbone 104, server 101–102 and Internet 103. In an embodiment of the present invention, IP packets are transferred between the components illustrated in FIG. 1*a*. In alternate embodiments of the present invention, other packet types are transferred between the components illustrated in FIG. 1*a*.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as a web site having web pages or application software components, to terminals 107 by way of device 106. In an embodiment of the present invention, terminals 107 share services and communicate by way of device 106.

Figure 6:
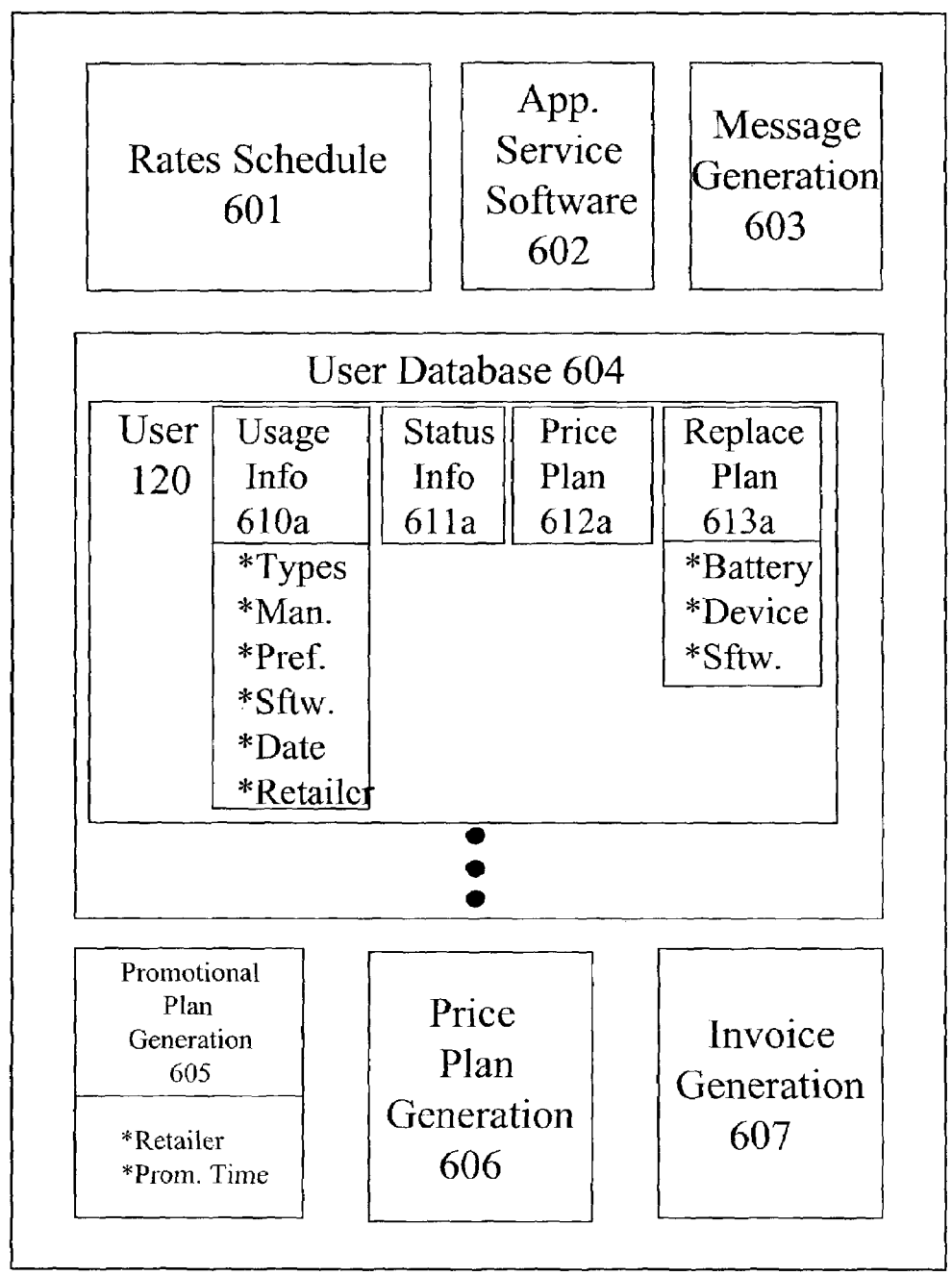
FIG. 6 illustrates a software block diagram architecture of server 101 according to an embodiment of the present invention.

In an embodiment of the present invention, server 101 includes rates schedule software component 601, application service software component 602, message generation software component 603, user database 604, promotional plan generation software component 605, price plan generation software component 606 and invoice generation software component 607, singly or in combination, as illustrated in FIG. 6 User database 604 includes information on users of short distance wireless networks in an embodiment of the present invention. For example, user database 604 includes a record for user 120 that includes usage information 610*a*, status information 611*a*, price plan 612*a* and replacement plan 613*a*, singly or in combination, in an embodiment of the present invention.

Usage information 610*a* includes telecommunication WAN usage of user 120 devices' in a short distance wireless network 116. For example, usage information 610*a* may store that PDA 107*b* accessed WAN 105, via device 106, to email two images between 3:45 p.m. and 3:47 p.m. on Monday, Nov. 26, 2001. In an alternate embodiment, more or less detail may be stored. In an embodiment of the present invention, usage information 610*a* includes 1) types of devices and/or terminals presently used in a user's short distance wireless network (Types), 2) respective manufacturer of the devices and/or terminals (Man.), 3) respective software components and version currently used (Sftw.), 4) user profile or preference—for example, user 120 is an AOL user and needs an AOL client for instant messaging (Pref.). In an alternate embodiment of the present invention, where (Retailer) or when (Date) a device or terminal was purchased is stored in usage information 610*a*. In an embodiment of the present invention, a retailer, distributor and/or manufacturer, by way of telephone and/or the Internet, provide where and when the device and/or terminal were purchased to server 101. In an alternate embodiment of the present invention, where and when the device is purchased (activated) is provided by the device and/or terminal to server 101. For example, a device and/or terminal are sold with a serial number identifying (i.e. prefix) the retailer selling the device and/or terminal. In an embodiment of the present invention, the serial number and activation time is transferred from the device and/or terminal to usage information 610*a* upon power up and configuration to a user's short distance wireless network.

Status information 611*a* includes the status or health of devices, software components and batteries in a short distance wireless network 116. For example, status information 611*a* may indicate PDA 107*b* has a battery that needs to be replaced. Alternatively, status information 611*a* may indicate that cellular modem 106 needs to be replaced. Similarly, status information 611*a* may indicate that cellular device 106 needs an update of an operating system in an embodiment of the present invention.

Price plan 612*a* includes a price plan for user 120. For example, user 120 has a contract with a telecommunication operator 121 that allows for downloading MP3 music files over WAN 105 to short distance wireless network 116 at $2.00 per file between 8:00 p.m. and 6:00 a.m., and $10.00 per file between 6:00 a.m. and 8:00 p.m. This pricing plan encourages users to download large files during off peak usage times of WAN 105 and also allows for the telecommunication operator 121 to generate increased revenue. A user also benefits by obtaining data, such as music files that are not time sensitive, in economical manner. Price plan 612*a* also includes a maximum periodic charge for unlimited usage of a particular type of device and/or data type in an embodiment of the present invention.

Price plan 612*a* also includes whether a user has chosen or purchased an option to have a software component downloaded to device 106 and/or terminals 107 in an embodiment of the present invention. For example, if a user has usage above a certain threshold minimum, telecommunication operator 121 provides a free software component, such as a ring tone or messaging terminal client to a device or terminal in short distance wireless network 116 by way of cellular signals 111. Similarly, a telecommunication operator 121 provides software components to a new device 106 and/or terminals 107 that may be purchased by a user from a particular distributor or retailer. In still a further embodiment of the present invention, telecommunication operator 121 provides a software component to a device 106 and/or terminals 107 during a predetermined promotional period of time. For example, if a user purchases a new headset 107*c* during a predetermined promotional period of time, telecommunication operator 121 will provide the necessary software components for headset 107c to operate in short distance wireless network 116. In an embodiment of the present invention, the software components for headset 107c provided by the telecommunication operator are more advanced than the software provided with headset 107c. Other similar price plans may be used for other types of or manufacturers of devices, data and/or time periods to increase telecommunication operator 121 revenue and also provide value added services to customers.

Replacement plan 613a includes a replacement plan for user 120. For example, a user 120 has a contract with a telecommunication operator 121, or other third party, to provide replacement batteries when a battery of a device, or terminals 107, in short distance wireless network 116 fails or is about to fail. Replacement plan 613a indicates whether a user 120 desires a replacement battery, replacement device, and/or software component to be provided. In an embodiment of the present invention, a replacement battery is mailed to user 120 when a failure or eminent failure of a battery is detected. Telecommunication operator 121 generates additional revenue by selling batteries and user 120 has the value added service of not having to 1) determine whether a battery needs to be replaced and 2) travel and shop for a replacement battery. Likewise, a software component may be provided to replace a defective software component or obsolete software component.

In still a further embodiment of the present invention, replacement plan 613a indicates whether a user 120 desires a replacement software component, such as a ring tone, game or newly released version of a software component. The replacement software component is provided when the new software component is released, on a periodic basis and/or as requested by a user in embodiments of the present invention.

Rates schedule software component 601 stores a schedule of rates for accessing WAN 105 by type of device accessing WAN 105 or causing to access WAN 105, manufacturer of device accessing WAN 105 or causing to access WAN 105, type of data transferred on WAN 105 and time period of accessing WAN 105, singly or in combination, in an embodiment of the present invention. For example, a telecommunication operator 121 may charge $0.25 per minute for a voice call between 6:00 p.m. and 8:00 p.m. and $1.00 for transferring a 2 megabyte file from a Dell™ laptop in short distance wireless network 116 at midnight. In another example in which a manufacturer is promoting the purchase of their products by subsidizing telecommunication usage, a user is charged $1.50 for transferring a 2 megabyte file from a Compaq™ laptop at any time during the day when the same user is charged much more when using another manufacturer's laptop. In still another embodiment of the present invention, a user is charged differently depending upon the software application used. For example, a user may be charged a first rate for using an email application program to send an email and a second rate for using a MP3 application software program for downloading a MP3 music file.

Invoice generation software component 607 generates an invoice 123 for user 120 in an embodiment of the present invention. Invoice 123 is printed out on printer 122 and mailed to user 120, as illustrated in FIG. 1b, in an embodiment of the present invention. In an alternate embodiment of the present invention, invoice 123 is e-mailed to user 120. Invoice generation software component 607 accesses user database 604, and in particular usage information 610a and price plan 612a, in generating invoice 123. In an embodiment of the present invention, invoice generation software component determines if usage times are within price plan maximum charges. In an alternate embodiment, invoice generation software component 607 access rates schedule software component 601 in order to obtain the appropriate rates that are multiplied by usage times in usage information 610a to obtain a total periodic charge on invoice 123.

Promotional plan generation software component 605 generates a promotional plan for user 120 or other potential users. Promotional plan generation software component 605 analyzes information in user database 604 in order to determine a plan for providing value to users and additional revenue to operator 121. For example, promotional plan generation software 605 will determine which users download MP3 files during peak WAN load times and may be unsuccessful in completing the download due to dropped signals. Operator 121 may generate a promotional plan provided to these selected users for downloading the MP3 files during off peak times at discounted rates. Operator 121 is able to generate added revenue during off peak times and a user 120 is able to receive reduce rates.

Other promotional plans include providing free access time to purchasers of devices having a specific manufacturer. A manufacturer of a headset 107c may want to promote sells of the headset by offering 100 free WAN 105 access minutes. Promotional plan generation software component 605 determines which users in users database 604 has purchased that particular manufactured headset and adjusts the price plan 612a to reflect the 100 free minutes.

Likewise, operator 121 may provide free or discounted devices to user 120 based on usage information 610a. Usage information 610a may indicate that a user does not have a PDA in short distance wireless network 116; yet, user 120 actively uses a cellular telephone. The free or discounted PDA will provide value to user 120 and also provide an opportunity for increased revenue for operator 121 by user 120 also accessing WAN 105 with the new PDA. Thus, both the operator 121 and user 120 benefit by increased revenue and a free PDA, respectively, when operator 121 knows which users in user database 604 tend to use a PDA often.

Price plan generation software component 606 generates a price plan for user 120 based on information in user database 604. For example, price plan generation 606 compares usage information 610a and replacement plan 613a to existing price plans to determine if user 120 can obtain additional services. For example, if user 120 uses a large amount of access time on WAN 105, but does not have a replacement plan, price generation software component generates a price plan that puts a maximum charge on usage time, saving user 120 charges, if user 120 signs up for a battery replacement plan. The new price plan may be mailed or emailed to user 120 in an embodiment of the present invention. In an embodiment of the present invention, promotional plan generation 605 stores a list of retailers (Retailer) participating in a promotional and/or a promotional period of time (Prom. Time).

Application service software component 602 includes software components that can be downloaded directly to a targeted terminal in terminal 107 in an embodiment of the present invention. Accordingly, a user 120 does not have to travel to a telecommunication operator service department, or other third party vendor, to have the software loaded into a terminal in order to obtain the added service. For example, user 120 has a MP3 headset manufactured by Sony™ and another MP3 headset manufactured by Panasonic™ in short distance wireless network 116. Based on information obtained from short distance wireless network 116, telecommunication operator 121 or another third party downloads 1) an application software component to the Sony™ headset that enables free MP3 downloads from a website and 2) an application software component to the Panasonic™ headset that enables special effects. The software application components could not be downloaded to the targeted terminal or terminals without first obtaining information about the terminals, such as manufacturer and type, in short distance wireless network 116.

Message generation software component 603 generates a message to short distance wireless network 116, and in particular to device 106 or terminals 107. In an embodiment of the present invention, the message may include software for preventing a particular device from having access to WAN 105. In an alternate embodiment, message generation software component 603 generates the results of promotional plan generation software component 605 and/or price plan generation software component 606 to operator 121. Based on these results, operator 121 may change rates in rates schedule software component 601. In an alternate embodiment of the present invention, message generation software component 603 generates a message to a third party to provide a replacement device, software component or battery to user 120.

In an embodiment of the present invention, server 101 generates a message transferred over WAN 105 to device 106 to obtain information from short distance wireless network 116. In an embodiment of the present invention, the message is an Internet/Protocol ("IP") message. In an embodiment of the present invention, the information from short distance wireless network 116 includes the type of terminals, including terminal manufacturer, accessing WAN 105, the type of data transferred on WAN 105, and the period of time when the data is transferred on WAN 105, singly or in combination. In an embodiment of the present invention, the information is transferred in response to a user input. In an alternate embodiment of the present invention, the information is generated periodically from device 106, or from terminals 107 generating a Bluetooth™ message to device 106 that then generates cellular signals 111 to WAN 105. In an embodiment of the present invention, device 106 stores device information, such as device type, model and manufacturer, of terminals 107 in short distance wireless network 116. Device 106 collects and logs the usage of various terminals 107 accessing WAN 105 in an embodiment of the present invention. This logged information and/or device information may then be transferred to server 101 periodically, in response to a message request or user input.

Server 102, coupled to carrier backbone 104, has similar software components described above and bypasses Internet 103 in an alternate embodiment of the present invention.

II. Hand-held Device/Terminal Hardware

Figure 2:
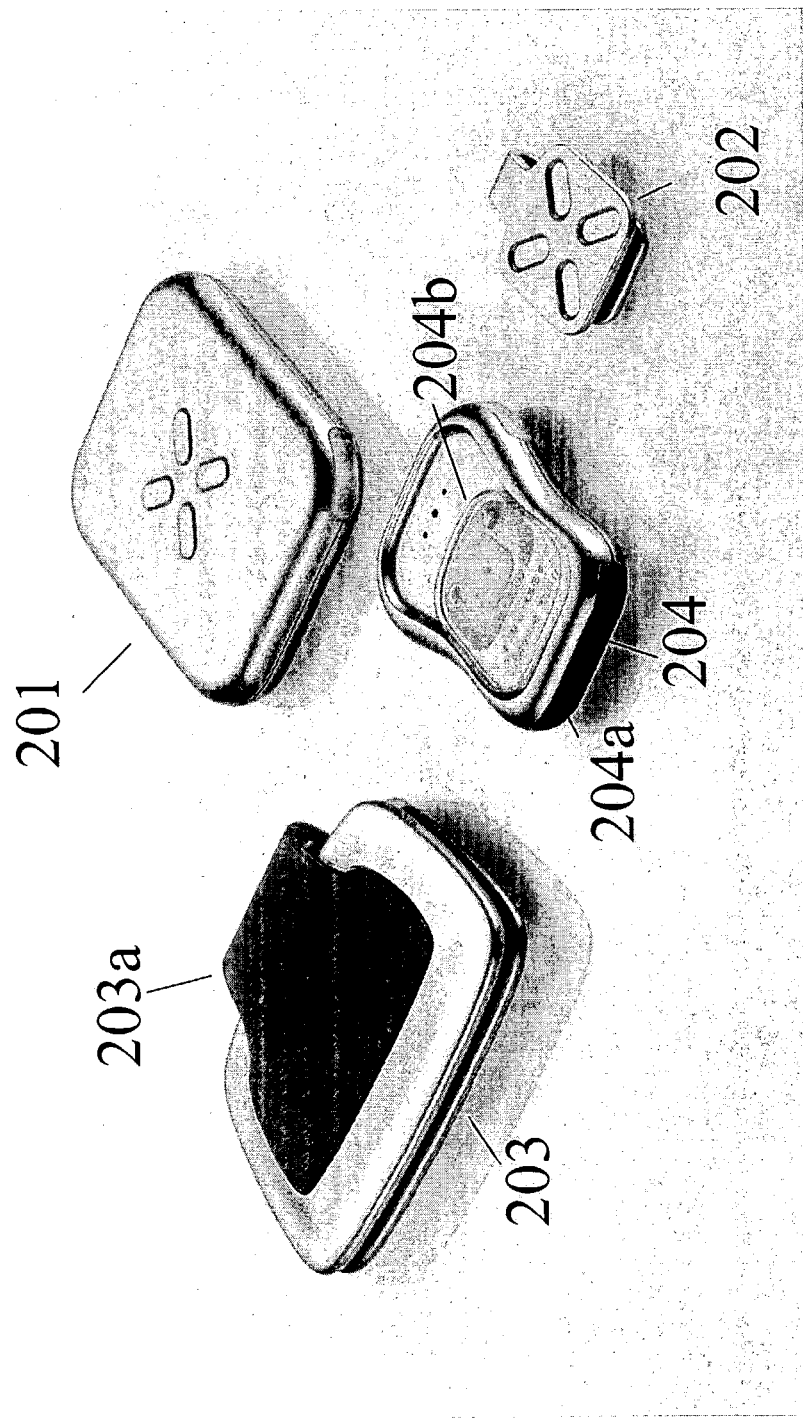
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3a illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1a, or device 350 illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1a. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
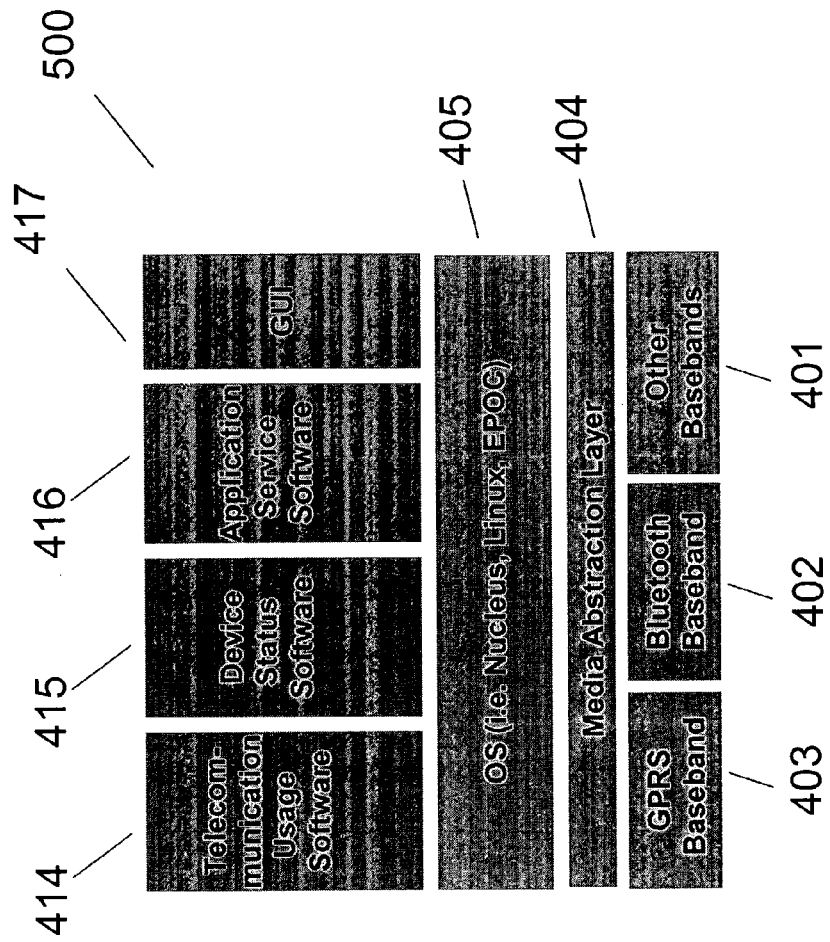
FIG. 4 is a software block diagram architecture for providing information from a short distance wireless network according to an embodiment of the present invention.

FIG. 4 illustrates a software architecture 500 for device 106 illustrated in FIG. 3a according to an embodiment of the present invention. In an embodiment of the present invention, software 500 is stored in FLASH memory 302 of device 106. In an alternate embodiment of the present invention, software components 414, 415 and 416 are stored in FLASH memory 353 in a terminal of terminals 107. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination. In yet another embodiment, software 500, or components thereof, is downloaded from server 102 illustrated in FIG. 1a.

Software 500 includes telecommunication software or physical layer protocol stacks, in particular cellular communications software 403 and short-range radio communications software 402. In an embodiment, communication software 403 is a GPRS baseband software component used with processor 306 to transmit and receive cellular signals. In an embodiment, communication software 402 is a Bluetooth™ baseband software component used with processor 307 to transmit and receive short-range radio signals. Other telecommunication software may be used as illustrated by other basebands 401.

In an embodiment of the present invention, operating system ("OS") 405 is used to communicate with telecommunications software 402 and 403. In an embodiment of the present invention, operating system 405 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 405 manages hardware and enables execution space for device software components.

Media abstraction layer 404 allows operating system 405 to communicate with basebands 403, 402 and 401, respectively. Media abstraction layer 404 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Telecommunication usage software component 414 and device status software component 415 are used to provide information from a short distance wireless network 116 in order to provide a software component-according to an embodiment of the present invention. In an alternate embodiment of the present invention, software components 414 and 415 are combined and/or partitioned into more software components. As described above application service software component 416 is loaded into device 106 or terminals 107 from server 101 in an embodiment of the present invention. In an alternate embodiment of the present invention, software components 414 and 415 are in either device 106 or in a single terminal, or combination of terminals, in terminals 107

In an embodiment of the present invention, telecommunication software component 414 keeps track of the usage of WAN 105 by device 106 and terminals 107. Telecommunication software component 414 stores which device or terminal in short distance wireless network 116 requested access to WAN 105, the type of data transferred and the period of time. This tracked usage information is then transferred to user database 604 in server 101, and in particular usage information 610a.

In an embodiment of the present invention, device status software component 415 keeps track of devices (including terminals 107) or batteries in short distance wireless network 116 that have failed or are about to fail. This status information is then transferred to user database 604 in server 101, and in particular status information 611a.

In an embodiment of the present invention, telecommunication usage software component 414, device status software component 415, operating system 405 and Bluetooth™ Baseband software component 402 are used to generate and receive short-range radio signals 110 that include usage and status information.

Furthermore, Graphics User Interface ("GUI") 417 is provided to allow a user-friendly interface.

FIGS. 5a–f illustrate methods for providing a software component in response to information from a short distance wireless network 116 according to an embodiment of the present invention. In an embodiment, the methods are performed, in part or completely, by software components illustrated in FIGS. 4 and 6. In an embodiment of the present invention, a logic box or step illustrated in FIGS. 5a–f may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the methods illustrated in FIGS. 5a–f.

Figure 5A:
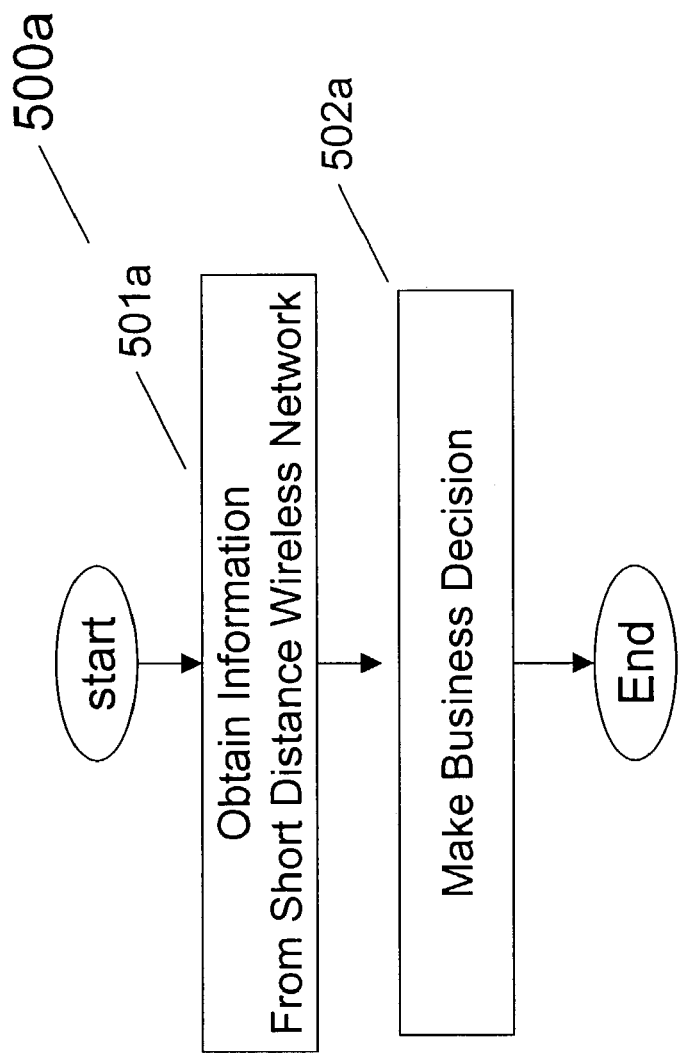

FIG. 5a illustrates method 500a according to an embodiment of the present invention. Information from short distance wireless network 116 is obtained as illustrated by logic block 510a. As described above, the information is WAN usage information and/or status information of device 106 and terminals 107. A business decision is then made as illustrated by logic block 502a. As described above, a business decision includes providing a software component to a user in an embodiment of the present invention. In alternate embodiments, an object is not provided.

Figure 5B:
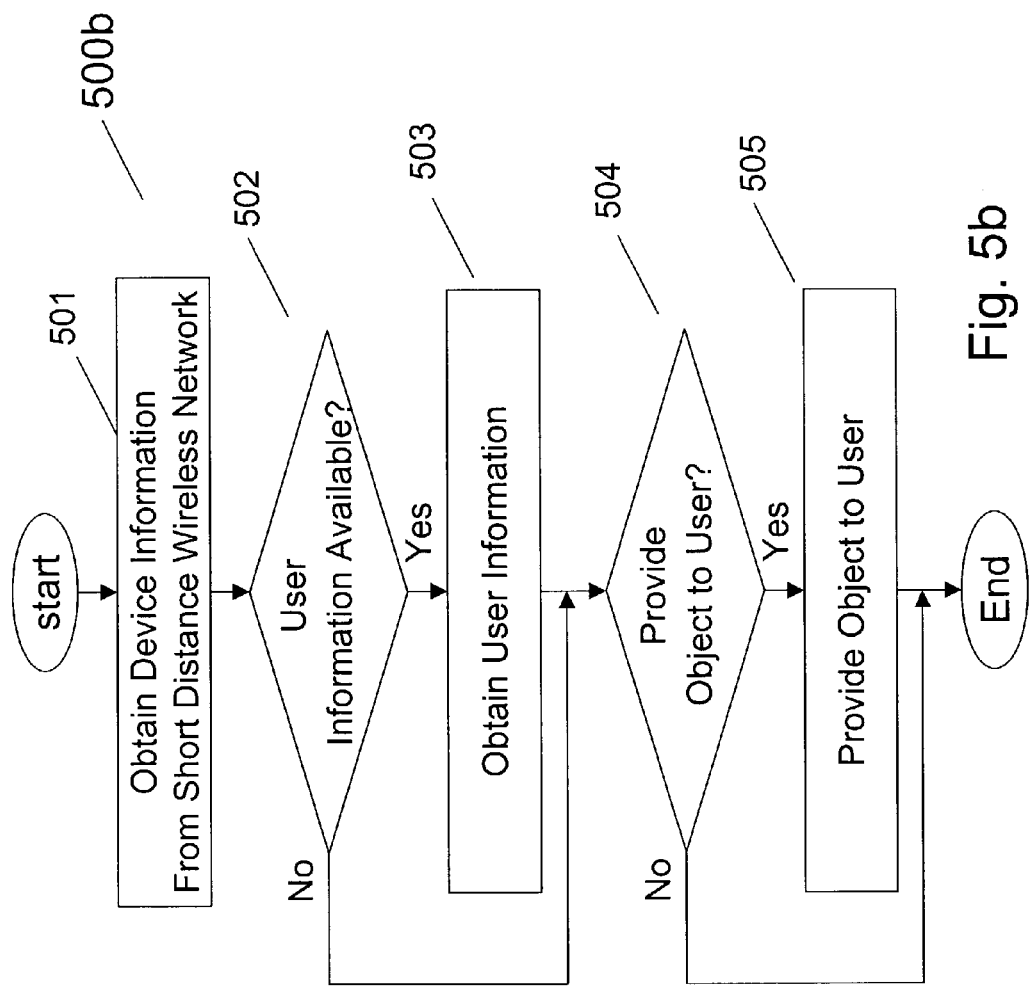

FIG. 5b illustrates method 500b according to an embodiment of the present invention. Information is obtained as in method 500a and illustrated by logic block 501. A determination is made in logic block 502 whether user information, such as user database 604, is available. If user information is available, logic transitions to logic block 503; otherwise, control passes to logic block 504. In logic block 503, user information, such as usage information 610a and/or status information 61a, is obtained. A determination is made in logic block 504 whether an object, such as a software component, is provided to a user. If a an object is to be provided, control transitions to logic block 505 where an object is provided to a user. Otherwise, method 500b ends.

Methods 505c–f in FIGS. 5c–f, respectfully, illustrate providing an object, such as a software component, to a user, as illustrated by logic block 505 in FIG. 5b, in embodiments of the present invention. As one of ordinary skill in the art would appreciate, there are numerous other methods that are included in providing an object to a user which are within the scope of the present claims.

Method 505c, shown in FIG. 5c, illustrates providing an invoice 123 to a user 120 responsive to information from short distance wireless network 116. In an embodiment of the present invention, the information is obtained from device 106 that has stored usage information of device 106 and terminals 107. A price plan is obtained from user information, such as user database 604, as illustrated by logic block 510. A type of device using a telecommunication network, such as WAN 105, manufacture of the device, period of time of usage, and type of data transferred on the telecommunication network is determined in logic blocks 511–514. In an embodiment of the present invention, this information is stored in usage information 610a after being obtained from device 106. The amount of charges for each usage occurrence is determined as illustrated in logic block 515. In an embodiment of the present invention, a price plan and rate schedules in rate schedules software component 601 are used to calculate charges for invoice 123. An invoice 123 is printed as illustrated in logic block 516 and invoice 123 is provided to user 120 as illustrated by logic block 517.

Figure 5D:
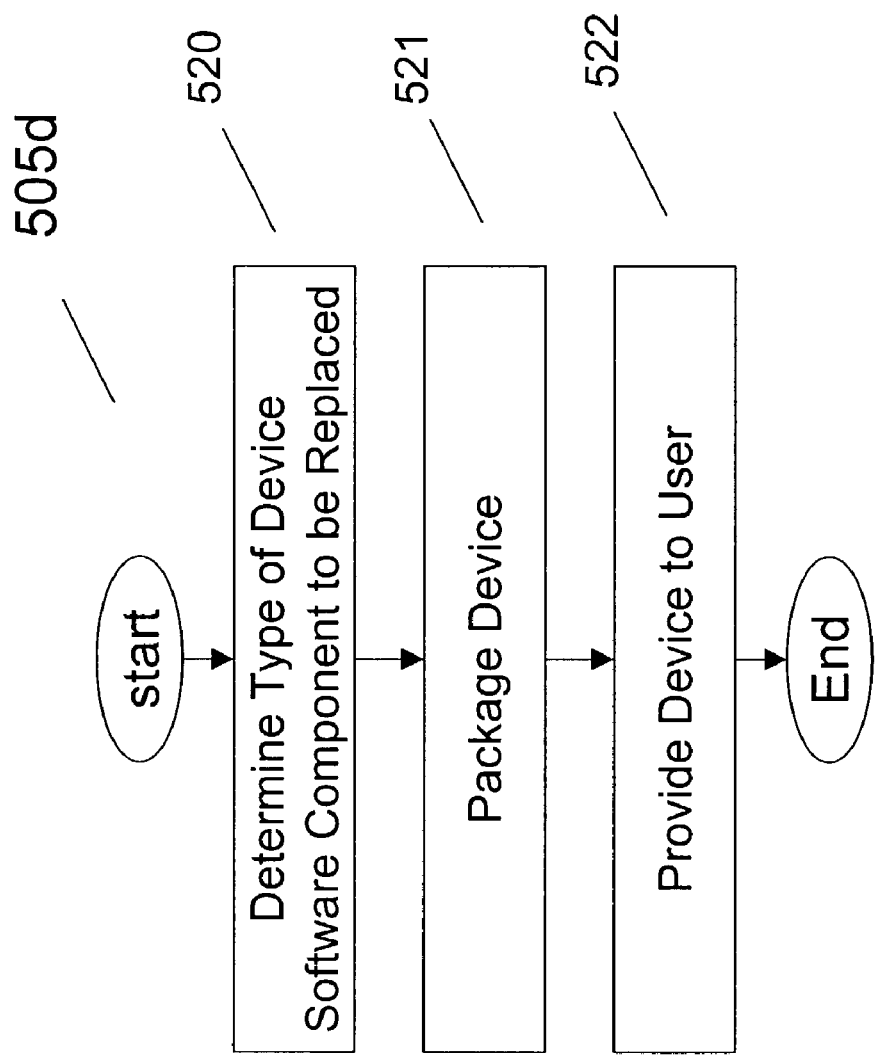

Method 505d, shown in FIG. 5d, illustrates providing a user 120 with a replacement device, software component or replacement battery in response to information from a short distance wireless network 116. A determination of whether a replacement device, software component or battery is needed in logic block 520. In an embodiment of the present invention, status information 610a is queried to determine if a device, software component or battery needs to be replaced. Replacement plan 613a is then queried to determine if user 120 has signed up for or agreed to the replacement service. If user 120 has signed up for the replacement service, a replacement device, software component or battery is packaged and mailed as illustrated by logic block 521 and 522 or provided as a replacement software component to a device and/or terminal in short distance wireless network 116. In an alternate embodiment of the present invention, manufacturers, distributors or retailers of replacement devices, software components and replacement batteries perform logic blocks 521 and 522, respectively. Similarly, logic block 520 includes generating a message from operator 121 to manufactures, distributors or retailers of replacement devices, software components and replacement batteries to provide the replacement device and/or battery to user 120.

Figure 5E:
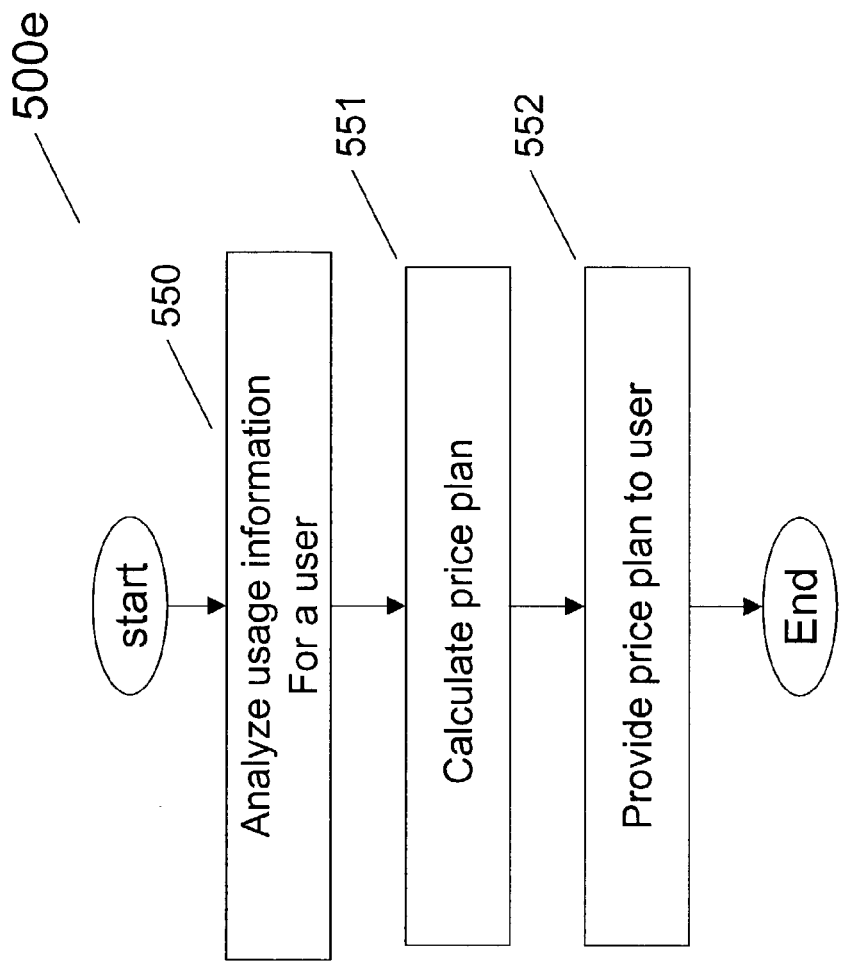

Method 500e, shown in FIG. 5e, illustrates providing a price plan 152 to a user 120 or potential user. Usage information is obtained as illustrated in logic block 550. In an embodiment of the present invention, usage information is obtained from usage information 610a in user database 604. A price plan 152 is then calculated as illustrated in logic block 551. For example, if user 120 rarely uses cellular telephone 106 and generates a large number of emails from PDA 107b, a price plan that caps charges for emails from PDA 107b and charges by the minute for voice usage on cellular telephone 106 would be calculated and provided to user 120 as illustrated by logic block 552. A price plan 152 may be hand delivered, verbalized, emailed or mailed to user 120 or a potential user in embodiments of the present invention. A promotional plan 151 may be similarly provided.

Figure 5F:
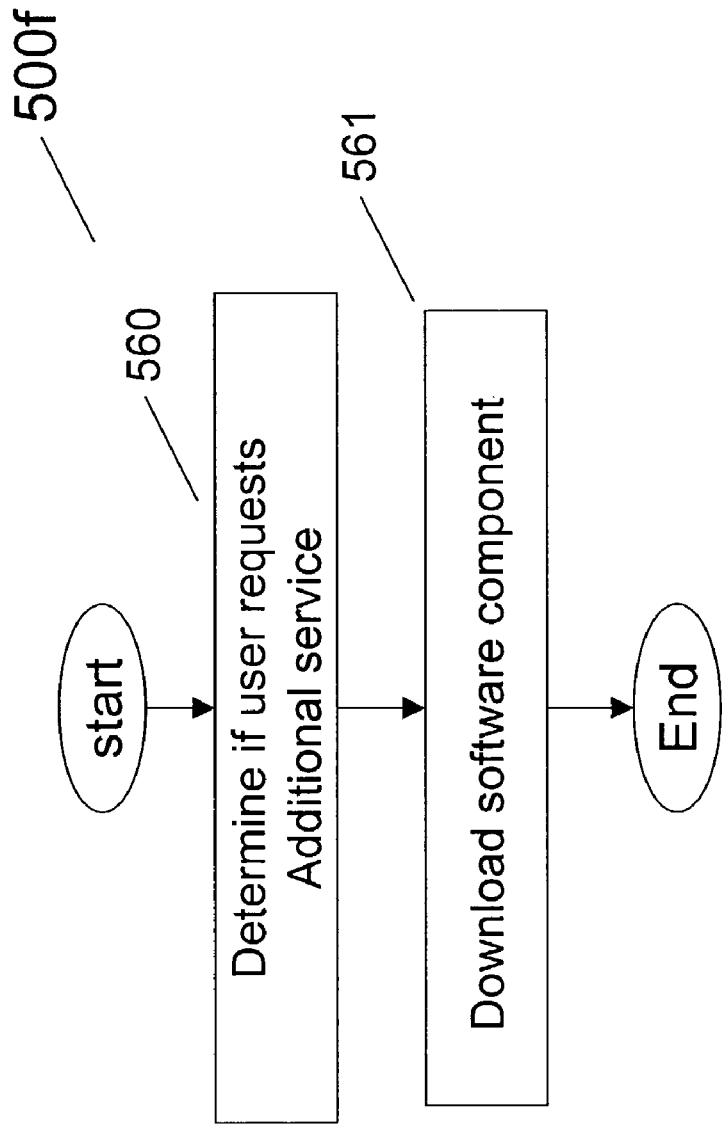

Method 500f, shown in FIG. 5f, illustrates downloading a software component 416 for adding service to short distance wireless network 116. A determination is made whether a user requests additional service as illustrated in logic block 560. In an embodiment of the present invention, user 120 mails, emails or telephones operator 121 to request the service. Application service software 416 is downloaded from server 101 by application service software component 602 as illustrated by logic block 561.

Figure 5G:
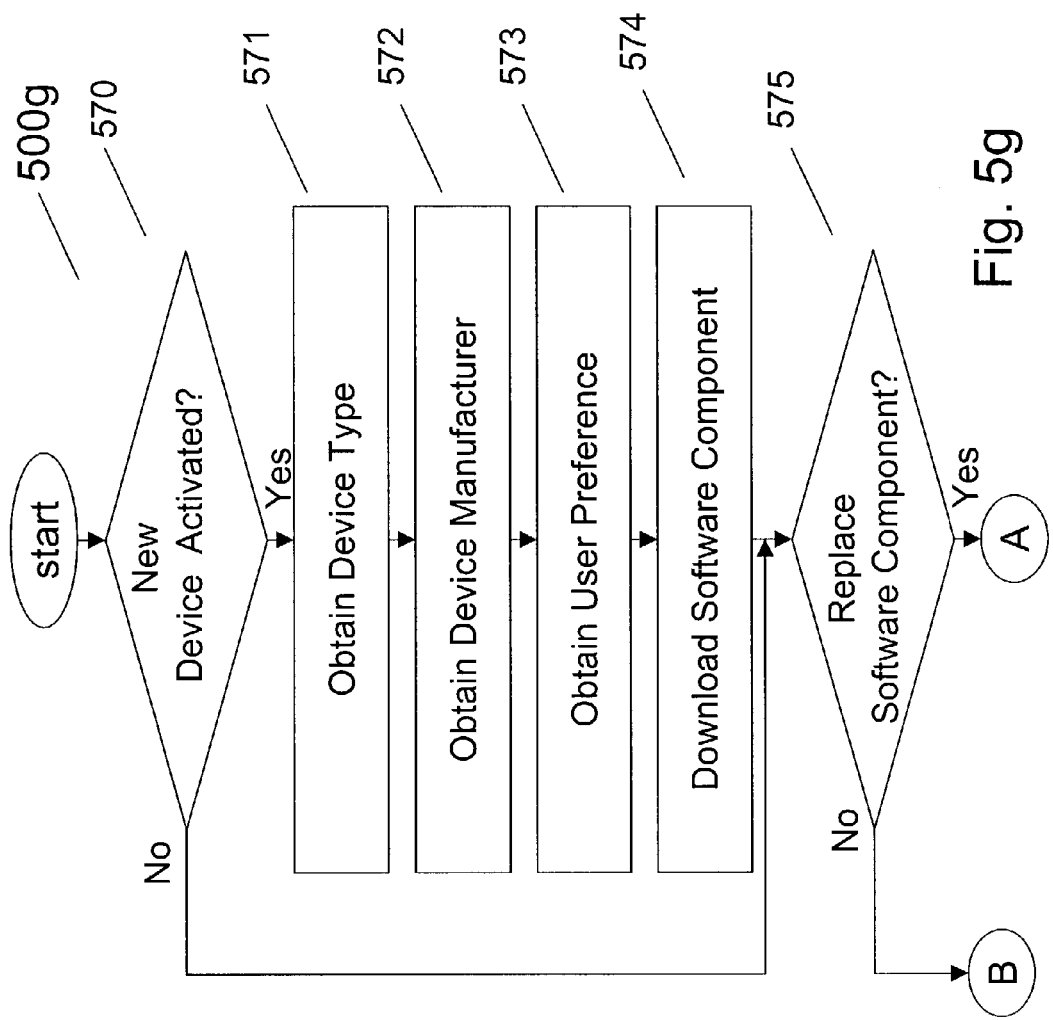
Figure 5H:
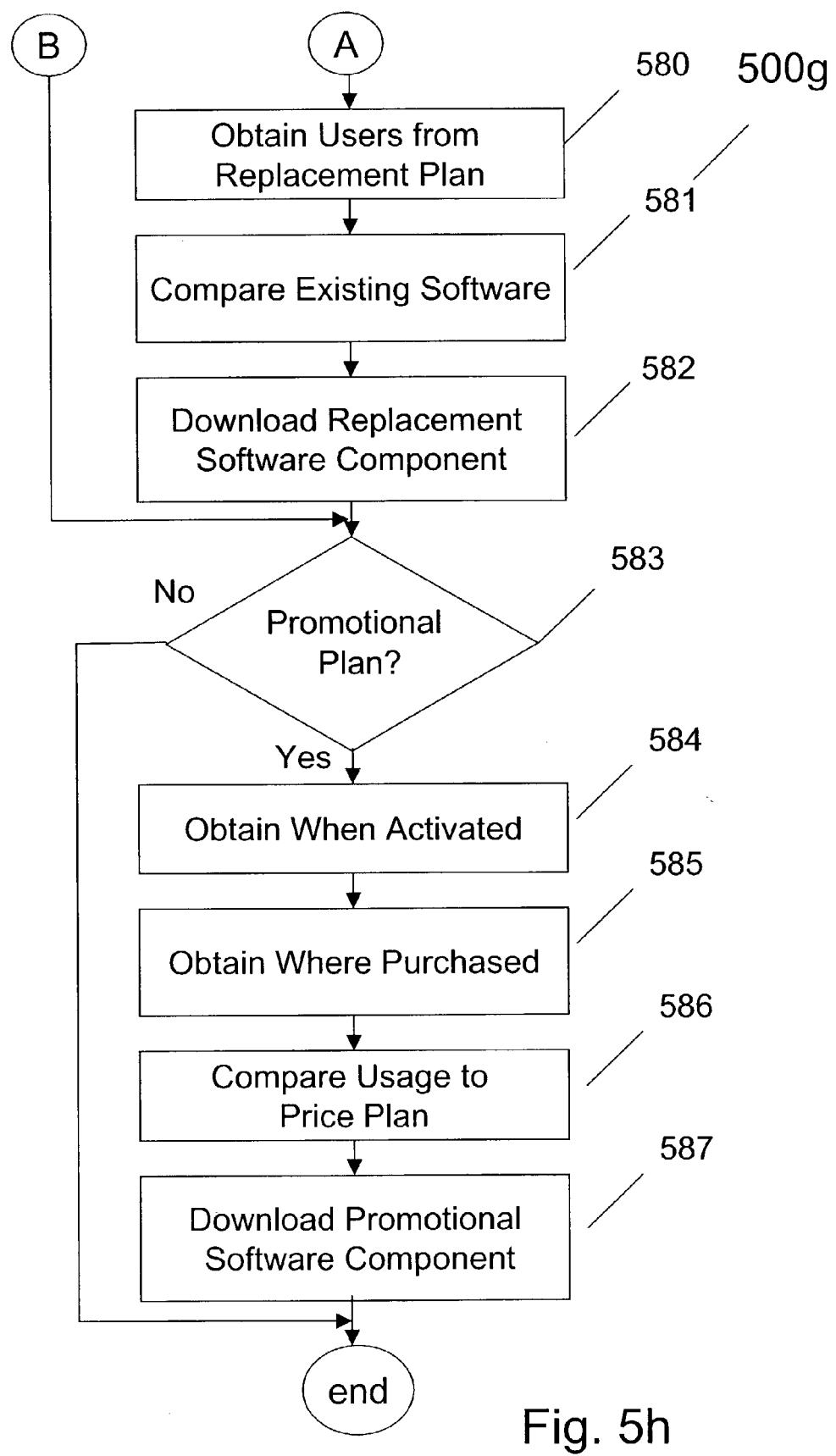

Method 500g, shown in FIGS. 5g–h, illustrates downloading a software component 416 to short distance wireless network 116. A determination is made whether a new terminal and/or device has been activated in short distance wireless network 116 as illustrated by logic block 570. In an embodiment of the present invention, a newly activated device/terminal generates a short-range radio signal to device 106. In an embodiment of the present invention, the short-range radio signal includes device information, such as a device type, a device manufacturer, where the device was purchased, and/or current date. Obtaining a device type and device manufacturer is illustrated by logic blocks 571 and 572. In an embodiment of the present invention, device information is obtained by generating a message, containing the device information, in a cellular signal from device 106 to WAN 105, and in particular to server 101. In an alternative embodiment of the present invention, device information is obtained by retrieving device information stored in the memory of device 106. A user preference is obtained as illustrated by logic block 573. In an embodiment of the present invention, a user preference is obtained by retrieving a user preference from user record 120 associated with the user of short distance wireless network 116. In particular, a user preference, such as being an AOL user, is retrieved from usage information 610a. Based upon a device type, device manufacturer and/or user preference, an appropriate software component is downloaded from application service software 602 to device 106, and ultimately to the newly activated device/terminal as illustrated by logic block 574. In an alternative embodiment of the present invention, application service software 602 is downloaded only to device 106.

A determination is made whether a software component is to be replaced as illustrated by logic block 575. If a software component is to be replaced, method 500g transitions to logic block 580; otherwise, method 500g transitions to logic block 583. In an embodiment of the present invention, application service software 602 access user record 120, and in particular replacement plan 613a to determine which users have a software component replacement plan as illustrated by logic block 580. Application software component 602 then compares existing software components, from usage information 610a, in short distance wireless network 116 with a list of newly released software components to determine whether any existing software components need to be replaced as illustrated by logic block 581. The identified software components are then downloaded as described above and illustrated by logic block 582. For example, if a user has signed up for a new software game for PDA 107b on a monthly basis, application software component 602 replaces monthly the previous software game with a newly released or previously unused software game.

A determination is made whether a promotional plan relating to software components is underway as illustrated by logic block 583. For example, advanced or additional software components are added to a new device purchased and activated during a set promotional period of time. Similarly, advanced or additional software components are added to a device purchased from a participating promotional retailer. An activation date for a device/terminal, which has recently entered a short distance wireless network, is obtained as described above and illustrated by logic block 584. Similarly, where the device/terminal was purchased is obtained as described above and illustrated by logic block 585. In an embodiment of the present invention, a user may obtain a discounted or free software component based on usage. For example, if a user has over a minimum number of minutes accessing WAN 105, a user may have a free ring tone downloaded. In an embodiment of the present invention, a user's price plan 612*a* is accessed and compared to usage information 610*a* to determine whether a free or discounted software component is to be downloaded as illustrated by logic block 586. In an embodiment of the present invention, a promotional period of time and/or participating promotional retailer is also accessed from promotional plan generation 605 and compared to obtained device information in order to determine whether a promotional software component should be downloaded as illustrated by logic block 586. A promotional software component is then downloaded as described above and illustrated by logic block 587. Method 500*g* then ends.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method, comprising:
    obtaining device information from a device in a short distance wireless network,
    wherein the device information includes a manufacturer of the device and a type of the device,
    wherein the obtaining includes:
        generating a short-range radio signal, including the device information, from the device to a cellular device, and
        generating a cellular signal, including the device information, from the cellular device to a processing device in a wide area network; and,
    downloading a software component to the device from the processing device in response to the device information.

2. The method of claim 1, wherein the software component is downloaded in response to a user preference of a type of the software component.

3. The method of claim 1, wherein the software component is downloaded in response to a date, and wherein the software component is an application software component.

4. The method of claim 1, wherein the software component is downloaded in response to where the device was purchased.

5. The method of claim 1, wherein the software component is downloaded in response to a user price plan.

6. The method of claim 1, wherein the device is a Bluetooth™ device communicating with a cellular device.

7. The method of claim 1, wherein the device is a messaging terminal.

8. The method of claim 1, wherein the device is a cellular device.

9. The method of claim 7, wherein the software component is an instant messaging terminal software component.

10. The method of claim 1, wherein the device includes a short-range radio processor and a 2.4 GHZ transceiver.

11. The method of claim 1, wherein the device includes a short-range radio processor and a 5.7 GHZ transceiver.

12. The method of claim 1, wherein the device is selected from a group consisting of a desktop computer, a laptop computer, a personal digital assistant, a headset, a pager, a printer, a watch, a thin terminal, a digital camera and an equivalent.

13. The method of claim 1, wherein the short distance wireless network is a Bluetooth™ network.

14. A method, comprising:
    generating a short-range radio signal, including device information, from a device; to a cellular device, wherein the device information includes a manufacturer of the device and a type of the device, and wherein the device and cellular device is in a short distance wireless network;
    generating a cellular signal, including the device information, from the cellular device to a processing device in a wide area network; and,
    downloading a software component to the device from the processing device using an Internet Protocol data packet in response to the device information and user information.

15. A system, comprising:
    a device to generate a short-range radio signal including device information, wherein the device information includes a manufacturer of the device and a type of the device;
    a cellular device to generate a cellular signal, including the device information, in response to the short-range radio signal; and,
    a processing device, having a database containing a plurality of software components, to provide a first software component in the plurality of software components, to the cellular device, in response to the device information.

16. The system of claim 15, wherein the database includes a user preference of a type of the first software component and the first software component is downloaded in response to the device information and the user preference.

17. The system of claim 15, wherein the first software component is downloaded in response to the device information and a date, and wherein the software component is an application software component.

18. The system of claim 15, wherein the first software component is downloaded in response to the device information and where the device was purchased.

19. The system of claim 15, wherein the first software component is downloaded in response to a user price plan.

20. The system of claim 15, wherein the database includes a user usage plan and the first software component is downloaded in response to the device information and the user usage.

21. The system of claim 15, wherein the device is a Bluetooth™ device.

22. The system of claim 15, wherein the device is a messaging terminal.

23. The system of claim 15, wherein the first software component is an instant messaging terminal software component.

24. The system of claim 15, wherein the device includes a short-range radio processor and a 2.4 GHZ transceiver.

25. The system of claim 15, wherein the device includes a short-range radio processor and a 5.7 GHZ transceiver.

26. The system of claim 15, wherein the device is selected from a group consisting of a desktop computer, a laptop computer, a personal digital assistant, a headset, a pager, a printer, a watch, a thin terminal, a digital camera and an equivalent.

27. The system of claim 15, wherein the device and cellular device are in a short distance wireless network.

28. The system of claim 15, wherein the processing device is in a wide area network including a cellular network.

29. An article of manufacture, including a computer readable medium, comprising:
- a short-range radio software component to receive a short-range radio signal, including device type information and device manufacturer information, from a device in a short distance wireless network; and,
- a cellular software component to generate a cellular signal, including the device type information and device manufacturer information, in a cellular network and receive a software component for the device in response to the device type information and device manufacturer information.

30. A method, comprising:
- obtaining a device type information and a device manufacturer information for a device in a short distance wireless network, wherein the obtaining includes,
  - generating a short-range radio signal, including the device type information and the device manufacturer information, from the device to a cellular device;
- obtaining a user preference of a type of software component;
- generating a cellular signal, including the device type information and the device manufacturer information, from the cellular device, in the short distance wireless network, to a processing device in a wide area network; and,
- downloading a software component to the cellular device from the processing device in response to the device type information, the device manufacturer information and the user preference.

* * * * *